S Patent

[19] United States Patent
Honath et al.

[11] 4,402,422
[45] Sep. 6, 1983

[54] FIELD ADJUSTABLE SEAL

[75] Inventors: Harold F. Honath, Coraopolis;
Gebhart J. Reiling, Pittsburgh;
Robert H. Swinderman, Mars;
Richard E. Hills, Coraopolis, all of
Pa.

[73] Assignee: Pittsburgh-Des Moines Corporation,
Pittsburgh, Pa.

[21] Appl. No.: 320,108

[22] Filed: Nov. 10, 1981

[51] Int. Cl.³ .......................... E04H 7/20; G21C 13/08
[52] U.S. Cl. ................................... 220/327; 220/453;
277/236
[58] Field of Search ....................... 220/327, 328, 453;
277/236, 32

[56] References Cited

U.S. PATENT DOCUMENTS

| 3,055,538 | 9/1962 | Schoessow | 220/453 |
| 3,522,901 | 8/1970 | Rauschenplat | 220/327 |
| 3,616,586 | 11/1971 | Mottran | 220/327 |
| 4,240,561 | 12/1980 | Hagstrom | 220/327 |

Primary Examiner—Robert I. Smith
Attorney, Agent, or Firm—Shoemaker and Mattare, Ltd.

[57] ABSTRACT

A seal joining a vacuum vessel head to a shell includes a flange on the head and a flange on the shell with a seal ring interposed therebetween. Spacers transfer the weight of the head and the vacuum load in the vessel to the seal ring. A sealing skirt attaches to the head flange and to the seal ring.

12 Claims, 9 Drawing Figures

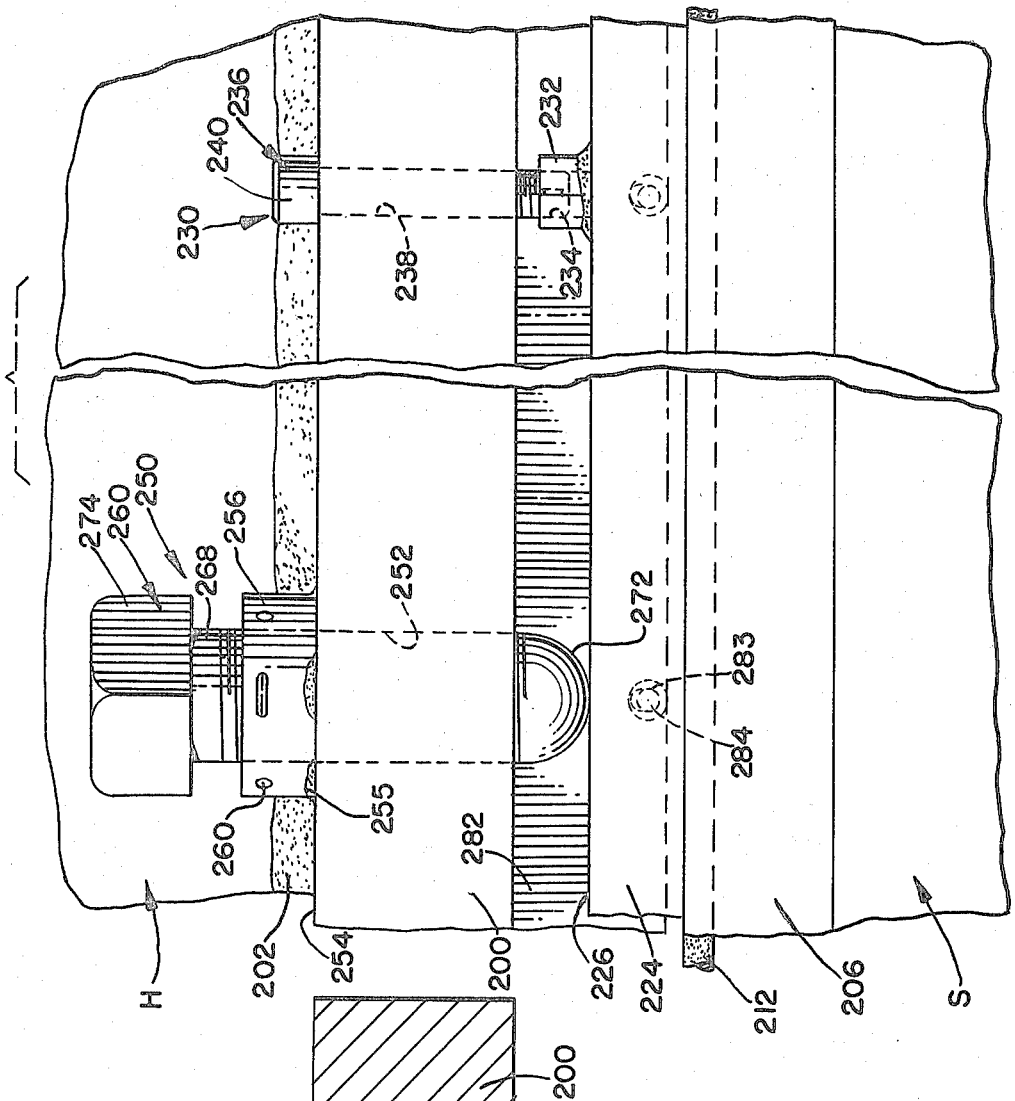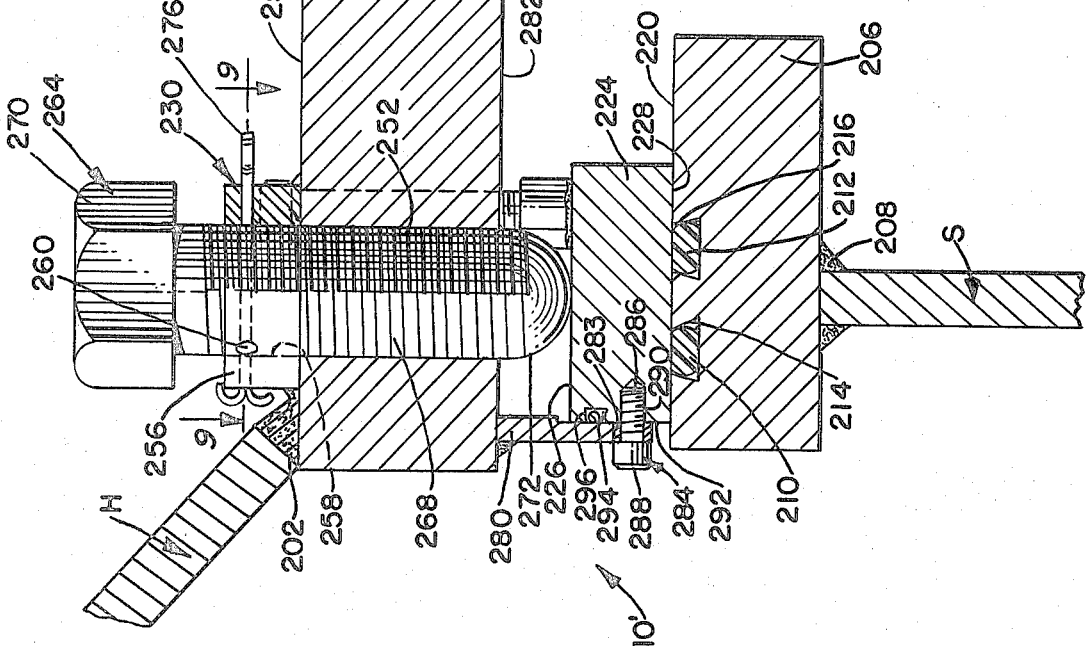

FIELD ADJUSTABLE SEAL

BACKGROUND OF THE INVENTION

The present invention relates, in general, to vacuum vessels, and, more particularly, to the coupling of a vacuum vessel head to the shell thereof.

The assignee of the present invention constructs vacuum vessels, and in one such vessel, the vessel head is removable. The joint between the vessel head and the shell includes two flanges and is fully described in U.S. Pat. No. 3,158,281.

While the joint disclosed in the just-referenced patent is quite effective, there is a complex connection of the flanges and the adjustment of the sealing flanges is not simple.

Furthermore, the sealing flanges in the patented structure function only as a portion of the sealing system.

SUMMARY OF THE INVENTION

The present invention is an improvement of the joint described in U.S. Pat. No. 3,158,281, and is easily adjustable and has sealing flanges which function as structural elements as well as sealing elements.

In one embodiment of the coupling joint, the compressive force of the weight of the head and the vacuum load in a vacuum vessel is transferred through a head flange into spacer blocks and adjustable spacers and then into a seal ring which compresses a gasket and effects a seal. Adjustments are made by varying the thickness of the spacer blocks and by adjusting the adjustable spacers. Once welding is effected, this seal cannot be further adjusted without breaking the welds. The shell flange and seal ring are machined in a shop, which minimizes erection time and permits a precision fit.

In another embodiment of the coupling joint, the compressive force of the weight of the head and the vacuum load is transferred through a head flange into adjusting bolts and then into a seal ring which compresses a gasket material and effects a seal. The shell flange and seal ring are machined in a shop, which limits erection time and permits a precision fit. Also, tapped holes for adjusting bolts and through holes for support bolts are shop prepared. The adjusting bolts are used to transmit pressure against the seal ring and have the ends thereof machined to a spherical radius. The support bolts maintain the position of the assembly when the head is raised. When the head is properly positioned, a seal skirt is fixed in place. Bolting connects the seal skirt to the seal ring. This bolting tightens the seal skirt against a small gasket which provides a secure seal between the seal skirt and the seal ring. Unlike the first embodiment, this embodiment can be readjusted by loosening the bolts without breaking any welds.

OBJECTS OF THE INVENTION

It is a main object of the present invention to improve the joint disclosed in U.S. Pat. No. 3,158,281 for coupling a vacuum vessel head to a shell.

It is another object of the present invention to provide a joint for coupling a vacuum vessel head to a shell which includes elements that function as structural elements as well as sealing elements.

It is yet another object of the present invention to provide a joint for coupling a vacuum vessel head to a shell which is more easily adjustable than the joint disclosed in U.S. Pat. No. 3,158,281.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 7 is a view taken along line 7—7 of FIG. 6.

FIG. 8 is an elevation view of a portion of the FIG. 6 joint.

DETAILED DESCRIPTION OF THE INVENTION

Figure 1:
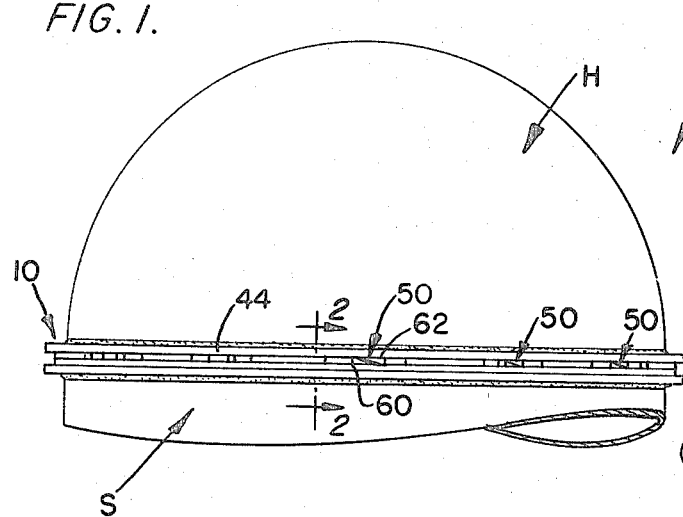
FIG. 1 is an elevation view of a vacuum vessel incorporating a joint embodying the teachings of the present invention.

Shown in FIG. 1 is a portion of a vessel V having a shell S having a head H removably supported thereon. The head is coupled to the shell by a coupling means 10 which forms the subject of the present disclosure.

Figure 3:
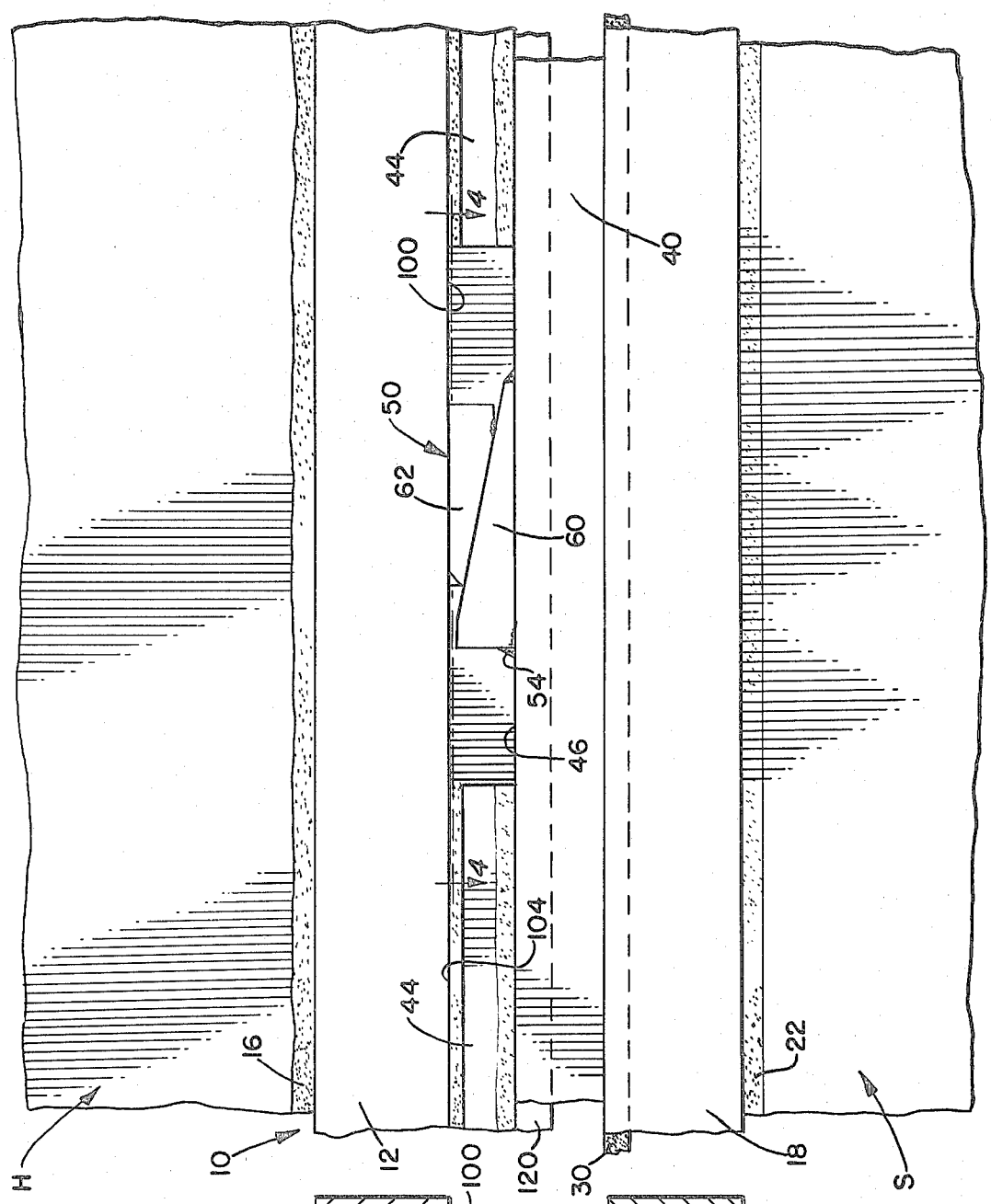
FIG. 3 is an elevation view of a portion of the joint embodying the teachings of the present invention.
Figure 2:
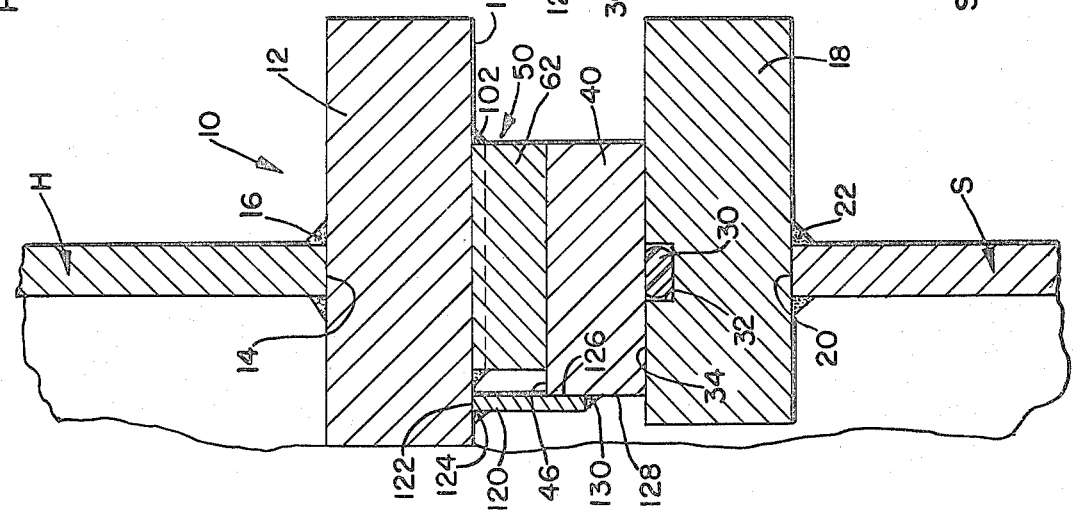
FIG. 2 is a view taken along line 2—2 of FIG. 1.

With reference to FIGS. 2 and 3, it is seen that the coupling means 10 includes a head flange 12 attached to a lower rim 14 of the head by welds 16 or the like and a shell flange 18 attached to the shell rim 20 by welds 22, or the like.

In the first embodiment, the attaching means includes a gasket 30 positioned in a groove 32 defined in upper surface 34 of the shell flange. A seal ring 40 rests on surface 34 and a multiplicity of spacer blocks 44 are circumferentially spaced about and rest on top surface 46 of the seal ring 40.

A plurality of adjustable spacers 50 are circumferentially spaced about and mounted by welds 54 or the like on the top surface 46 so that adjustable spacers are interpositioned between spacer blocks.

Figure 5:
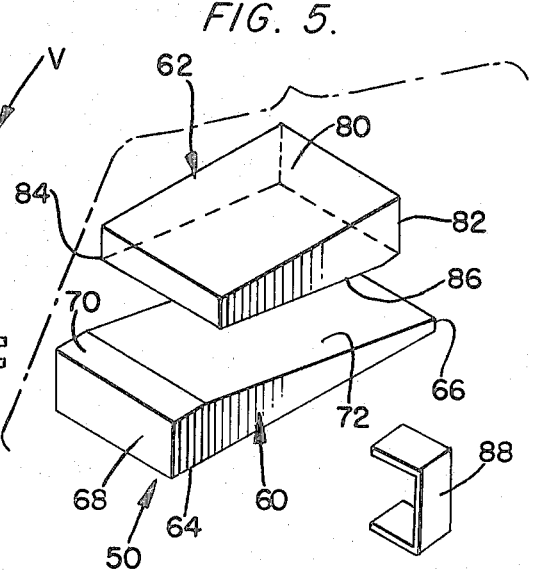
FIG. 5 is an exploded perspective of an adjustable spacer used in the joint embodying the teachings of the present invention.
Figure 4:
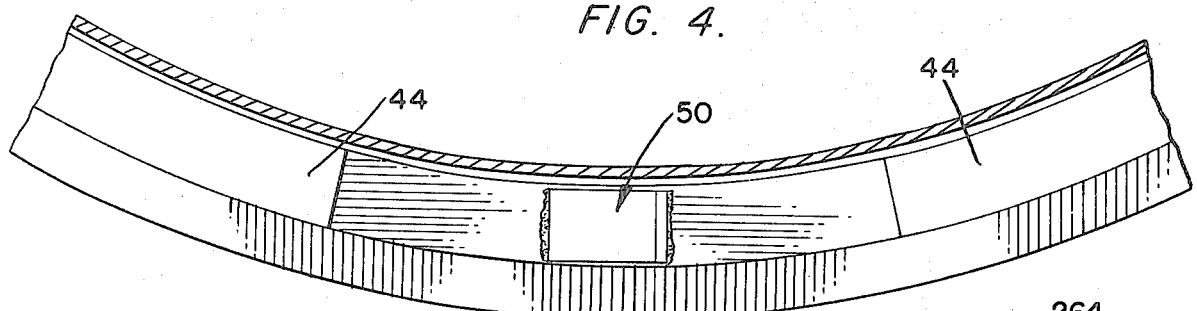
FIG. 4 is a view taken along line 4—4 of FIG. 3.
Figure 9:
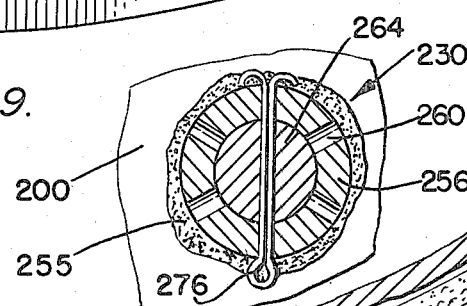
FIG. 9 is a view taken along line 9—9 of FIG. 7.
Figure 6:
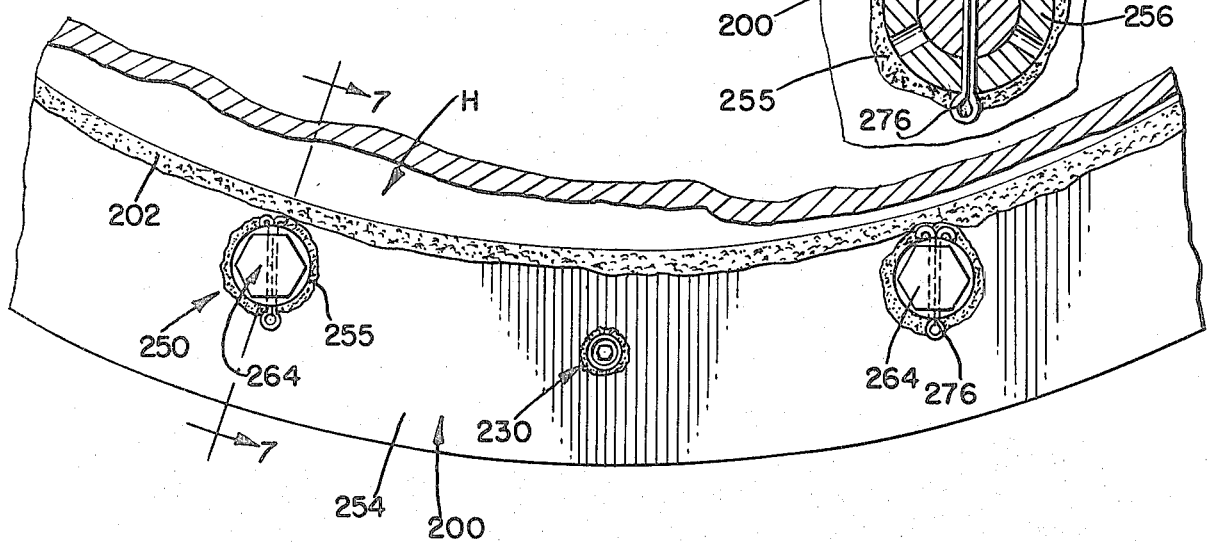
FIG. 6 is a plan view of another form of the joint embodying the teachings of the present invention.

An adjustable spacer 50 is best shown in FIG. 5 to include wedge-shaped blocks 60 and 62. The block 60 includes a base 64, a front edge 66, a rear edge 68, a top face 70 and an inclined ramp 72 connecting face 70 to front edge 66. Welds 54 attach the block 60 to the seal ring.

The block 62 includes a top face 80, a rear face 82, a front edge 84 and a ramp 86.

As shown in FIGS. 3 and 5, the ramps 72 and 86 are placed in sliding engagement and temporary clamps such as clamp 88 (shown schematically for purposes of example, as any suitable clamp can be used) are used to bring the wedge-shaped blocks into close contact with the head flange and the seal ring. As shown in FIGS. 2 and 3, the top block 62 is attached to undersurface 100 of the head flange 12 by welds 102, or the like, and the bottom block 60 is attached to the top surface 46 of the seal ring.

As is also shown in FIG. 3, top surfaces 104 of the spacer blocks abut the head flange undersurface 100.

A seal skirt 120 is attached at a top rim 122 thereof to undersurface 100 by a weld 124. The skirt extends downwardly from the head seal and forms a lap joint 126 with inner face 128 of the seal ring 40 and is attached thereto by a weld 130 or the like.

Assembly of vessel V using the coupling means 10 is as follows. The shell S has stock for field trim and the top shell edge is trimmed to a level line. The pre-machined shell flange is fitted to be a complete ring and any joints are weld sealed. The top surface and groove are hand finished. The shell flange is then welded to the shell. The welds are preferably fillet welds which are sized in accordance with the vacuum rating of the vessel.

The pre-machined seal ring 40 is fitted to define a complete circle and any joints are seal welded. The bottom surface welds of the ring 40 are then hand finished. The seal ring is then clamped to the shell flange.

Temporary shims, not shown, are located on the seal ring, and the head H is placed on the vessel.

At the location where each spacer block is to be located, the distance between the head flange and the seal ring 40 is measured to three decimal place accuracy. It is noted that the spacer blocks or adjustable spacers will be located closely enough together to keep seal ring deflection to a minimum when that seal is under compression. The spacer blocks are then machined according to these measurements.

The machined spacer blocks and adjustable spacers are installed and welded to the head flange and to the seal ring.

The temporary shims are then removed. Any clamps also are removed.

The seal skirt 120 is then installed by welding to the head flange and to the seal ring.

The head is then lifted and gasket 30 is installed, and the head is then repositioned.

A second embodiment of the coupling means is shown in FIGS. 6-9 and is denoted as coupling means 10'. The coupling means 10' includes a head flange 200 affixed to head H by a weld 202 or the like and the shell flange 206 affixed to the shell S by welds 208, or the like. Gaskets 210 and 212 are positioned in grooves 214 and 216, respectively, defined in upper surface 220 of the shell flange. Although two gaskets are shown, any number of gaskets can be used without departing from the spirit and scope of the present invention.

A seal ring 224 has an upper surface 226 and a lower surface 228 which rests on the shell flange upper surface 220.

A plurality of support mechanisms 230 are located around the coupling mechanism. Each support mechanism includes a step collar 232 attached to seal ring upper surface 226 and having a threaded bore 234 defined therein. A support bolt 236 fits through a bore 238 defined through the head flange 200 and is threadably received in the threaded bore 234 of the step collar. The bolt 236 includes a head 240 and couples the head flange 200 to the seal ring 224. The support bolts assist in maintaining proper location of the seal ring during head handling.

A plurality of adjusting bolt mechanisms 250 are located about the coupling mechanism 10'. Each adjusting bolt mechanism includes a threaded bore 252 defined through the head flange 200 and a collar 256 affixed to the upper surface 254 of the head flange by a weld 255, or the like. The collar 256 includes a bore 258 defined therethrough and a plurality of holes 260 defined therein to extend radially of the collar. The bore 258 is aligned with the bore 252, and the holes 260 are located to be diametrically aligned with each other about the collar.

A bolt 264 has a threaded shank 268 having a head 270 on one end thereof and a spherical distal end 272 on the other end thereof. The bolt 264 is received through the aligned bores 252 and 258, and distal end 272 rests on seal ring upper surface 226 to transfer the weight of the head H and the vacuum load to the seal ring.

A hole is defined transversely through the bolt shank 268 to be aligned with the holes 260 in the collar. A cotter pin 276 or other locking means is received through aligned holes 260 and the hole in the bolt shank to prevent rotation of the bolt with respect to the head flange.

A sealing skirt 280 is affixed at one end thereof to bottom surface 282 of the head flange 20 and extends downwardly therefrom. A plurality of slots 283 are defined through the skirt and a bolt 284 is accommodated in each slot. Each of the bolts includes a threaded shank 286 and a head 288. The bolts are each received in a tapped hole 290 defined in seal ring inner surface 292 to attach the skirt 280 to that seal ring. The seal skirt is pre-machined and driled with slotted holes 283 in a shop. A seal 294 is seated in a groove 296 defined in seal ring inner surface 292 to further seal the skirt to the seal ring.

The coupling means 10' permits adjustment of the seal flanges 224 and 206 at field installation, with later adjustments being made as required without removal of welds. The shell flange and seal ring are pre-machined, but the tapped holes 290 are not defined until installation. The seal ring and shell flange are rolled into ring segments in a shop.

The vessel head H in the second embodiment is shop fabricated in sub-assemblies and assembled into a complete unmachined unit in the field. The tapped adjusting bolt holes 252 and the through holes 238 are defined in the head flange 200 in the shop. The collars 256 are installed in the shop.

The adjusting bolts are spaced to limit deflection of the seal ring under seal compression loading. The bolts are sized to withstand the projected vacuum load of the vessel. The cotter pins 276 prevent undesired movement of the adjusting bolts.

The assembly of a vessel using coupling means 10' is as follows. The top shell edge is trimmed to a level line. The pre-machined shell flange is fit to form a complete ring and seal welded to splice any joints therein. The upper surface 220 of that flange and the grooves 214 and 216 are hand finished. The shell flange is then welded to the shell. Preferably, the welds are fillet welds.

The pre-machined seal ring is fit to form a complete ring and any joints are seal welded. The surfaces 228 and 292 and groove 296 are hand finished. The seal ring is then clamped to the shell flange 206, and the head H is placed on the vessel. Temporary shim blocks, not shown, are used between the seal ring and the head flange.

The adjusting bolts 264 are installed and turned down to just contact the sealing ring.

Support bolts 236 are installled and the step collars 232 are affixed to the seal ring. The bolts 236 are then snugged down. In a preferred form of the support mechanism, the bolts or nuts have a built-in locking element.

The temporary shims and clamps are then removed.

The adjusting bolts are drilled, and locking means, such as the cotter pins 276, are installed.

The sealing skirt 280 is installed. The seal ring tapped holes 290 are defined, drilled and tapped, and bolts 284 are installed.

The head H is then lifted, and the gaskets 210 and 212 are installed. The head is then replaced.

It is noted that elements and details of the coupling mechanisms 10 and 10' can be interchanged and varied without departing from the scope of the present invention. For example, the number of gaskets can be varied, the sealing skirts can be welded or elastomeric, the head can be dished-only or hemispherical.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

We claim:

1. Joint means for coupling a vessel head to a vacuum vessel shell comprising:
    a head flange on the vessel head;
    a shell flange on the shell;
    a seal ring supported on said shell flange;
    a sealing gasket located in a groove defined in said shell flange adjacent said seal ring;
    support means for transferring the weight of the head and the vacuum load of the vacuum vessel to said seal ring;
    adjustable means interposed between said head flange and said seal ring; and
    a sealing skirt coupling said head flange to said seal ring.

2. The joint means defined in claim 1 wherein said support means includes a plurality of spacer blocks interposed between said head flange and said seal ring.

3. The joint means defined in claim 1 wherein said support means includes a plurality of adjusting bolts accommodated in tapped bores defined through said head flange.

4. The joint means defined in claim 3 further including a collar affixed to said head flange to be aligned with each of said tapped bores.

5. The joint means defined in claim 4 further including means on said collars for preventing rotation of said bolts within said collars.

6. The joint means defined in claim 3 further including coupling means for coupling said head flange to said seal ring.

7. The joint means defined in claim 6 wherein said coupling means includes a threaded step collar affixed to said seal ring and a support bolt received through a bore defined in said head flange.

8. The joint means defined in claim 1 wherein said adjustable means includes a plurality of wedge-shaped blocks each having an inclined ramp defined thereon.

9. The joint means defined in claim 1 further including bolts coupling said sealing skirt to said seal ring.

10. The joint means defined in claim 3 wherein said adjusting bolts each includes a spherical end for contacting said seal ring.

11. The joint means defined in claim 1 including a plurality of sealing gaskets.

12. The joint means defined in claim 1 further including a second sealing gasket interposed between said sealing skirt and said seal ring.

* * * * *